United States Patent
Finchelstein et al.

(10) Patent No.: US 9,383,968 B2
(45) Date of Patent: Jul. 5, 2016

(54) MATH PROCESSING BY DETECTION OF ELEMENTARY VALUED OPERANDS

(71) Applicant: NVIDIA CORPORATION, Santa Clara, CA (US)

(72) Inventors: Daniel Finchelstein, Redwood City, CA (US); David Conrad Tannenbaum, Austin, TX (US); Srinivasan (Vasu) Iyer, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 275 days.

(21) Appl. No.: 14/040,370

(22) Filed: Sep. 27, 2013

(65) Prior Publication Data

US 2015/0095394 A1 Apr. 2, 2015

(51) Int. Cl.
*G06F 7/38* (2006.01)
*G06F 7/50* (2006.01)
*G06F 7/544* (2006.01)

(52) U.S. Cl.
CPC ............. *G06F 7/50* (2013.01); *G06F 7/5443* (2013.01); *G06F 2207/3884* (2013.01)

(58) Field of Classification Search
None
See application file for complete search history.

(56) References Cited

U.S. PATENT DOCUMENTS

| 7,058,830 | B2 * | 6/2006 | Dhong | G06F 1/3203 708/490 |
| 7,587,582 | B1 * | 9/2009 | Sudharsanan | G06F 9/3012 708/100 |
| 2006/0149803 | A1 * | 7/2006 | Siu | G06F 9/30014 708/501 |
| 2007/0185953 | A1 * | 8/2007 | Prokopenko | G06F 7/483 708/523 |
| 2014/0122554 | A1 * | 5/2014 | Hickmann | G06F 7/483 708/523 |
| 2014/0122555 | A1 * | 5/2014 | Hickmann | G06F 7/483 708/523 |
| 2015/0095394 | A1 * | 4/2015 | Finchelstein | G06F 7/50 708/523 |

* cited by examiner

*Primary Examiner* — David H Malzahn
(74) *Attorney, Agent, or Firm* — Artegis Law Group, LLP

(57) ABSTRACT

One embodiment of the present invention includes a method for simplifying arithmetic operations by detecting operands with elementary values such as zero or 1.0. Computer and graphics processing systems perform a great number of multiply-add operations. In a significant portion of these operations, the values of one or more of the operands are zero or 1.0. By detecting the occurrence of these elementary values, math operations can be greatly simplified, for example by eliminating multiply operations when one multiplicand is zero or 1.0 or eliminating add operations when one addend is zero. The simplified math operations resulting from detecting elementary valued operands provide significant savings in overhead power, dynamic processing power, and cycle time.

20 Claims, 7 Drawing Sheets

MATH PROCESSING BY DETECTION OF ELEMENTARY VALUED OPERANDS

GOVERNMENT RIGHTS IN THIS INVENTION

This invention was made with U.S. government support under LLNS subcontract B599861 awarded by DOE, and with government support under agreement No. HR0011-13-3-0001 awarded by DARPA. The U.S. government has certain rights in this invention.

BACKGROUND OF THE INVENTION

1. Field of the Invention

Embodiments of the present invention relate generally to computer processing and, more specifically, to a technique for improved math processing by detection of elementary valued operands.

2. Description of the Related Art

In computer systems, in general, and in graphics processing units (GPUs), in particular, a great number of arithmetic operations are typically performed. A minimal element of floating point arithmetic is called a fused floating point multiply-add (FFMA), which performs the function of multiplying two inputs and adding a third input to the resulting product. Frequently, one or more of the operands input to a math unit have elementary values such as zero or 1.0. When these operands occur, the math operation becomes reasonably trivial, in that zero times any number is zero and 1.0 times any number is that same number. Further, instances can occur where operands, though not equal to zero, are near enough to zero to render the result effectively zero. Similarly, instances occur where an operand, though not equal to 1.0, are near enough to 1.0 to render the result effectively a multiplication by 1.0. In conventional systems, arithmetic operations are typically performed on input operands without regard to the occurrence of these elementary values.

One drawback to the above approach is that the full dynamic power of the multiply-add operation is incurred when elementary operands occur. In addition, the full cycle time of the multiply add is incurred. Another drawback is that, when math processing results of zero occur at the register file level, essentially all further math operations for that register become trivial. When math processing results of zero occur at the register file level, performing further math operations at the register file level is arguably unnecessary and incurs needless power and cycle time costs.

Accordingly, what is needed in the art is a more effective technique for detecting the occurrence of elementary valued operands and implementing appropriately simplified math processing.

SUMMARY OF THE INVENTION

One embodiment of the present invention sets forth a method for performing multiply-add operations, including receiving a plurality of input operands, detecting that at least one input operand has an elementary value, gating off one or more portions of a math processing circuit based on the at least one operand having the elementary value, after gating off one or more portions of the math processing circuit, performing one or more abbreviated math operations via the math processing circuit to generate a result, and forwarding the result to a final output register.

One advantage of the disclosed approach is that the ability to bypass all or part of a math unit when elementary valued operands are detected allows a significant power saving and a reduction in cycle time. Further, detection at the math processing subsystem level reduces dynamic math processing power to zero for that math processing subsystem.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
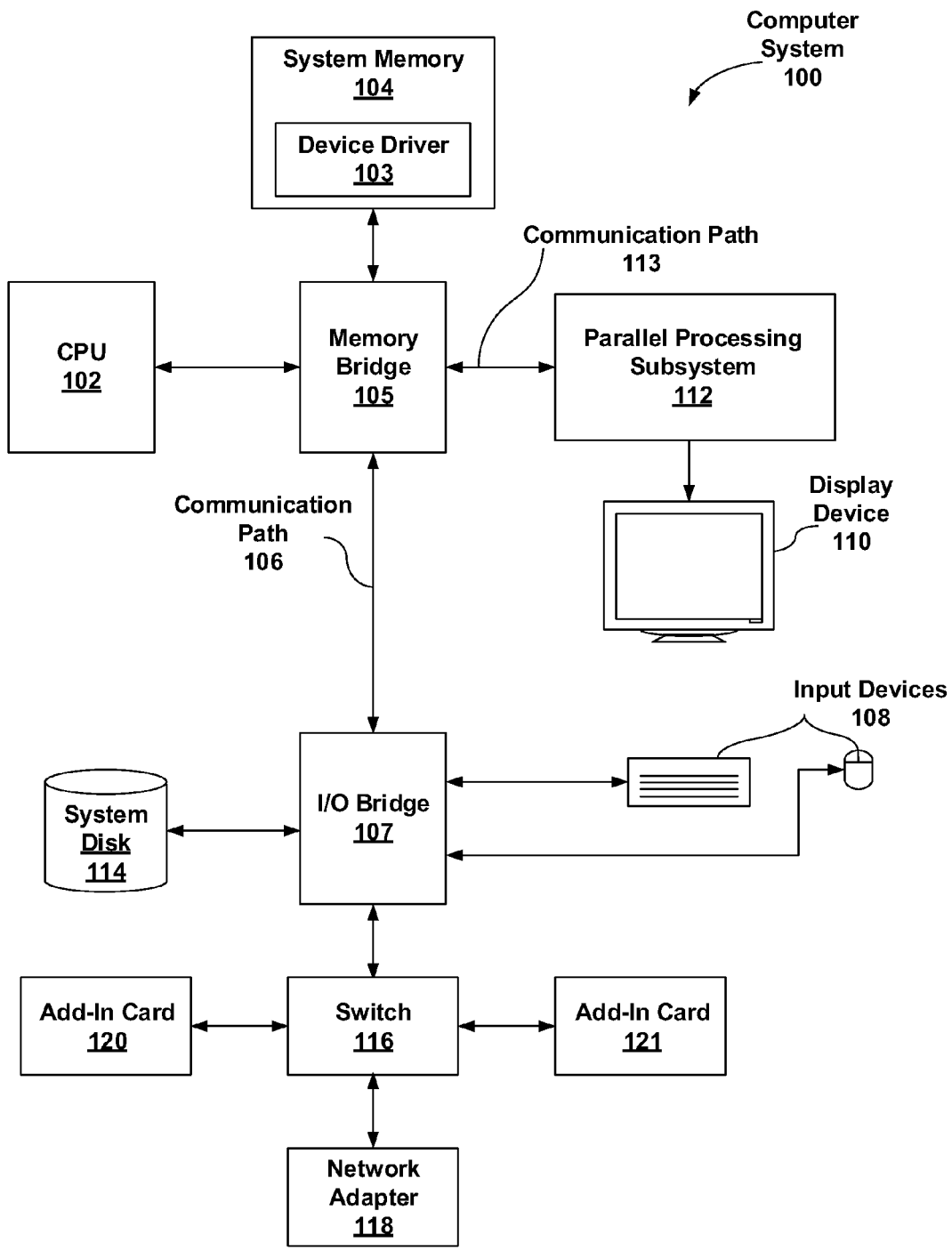
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
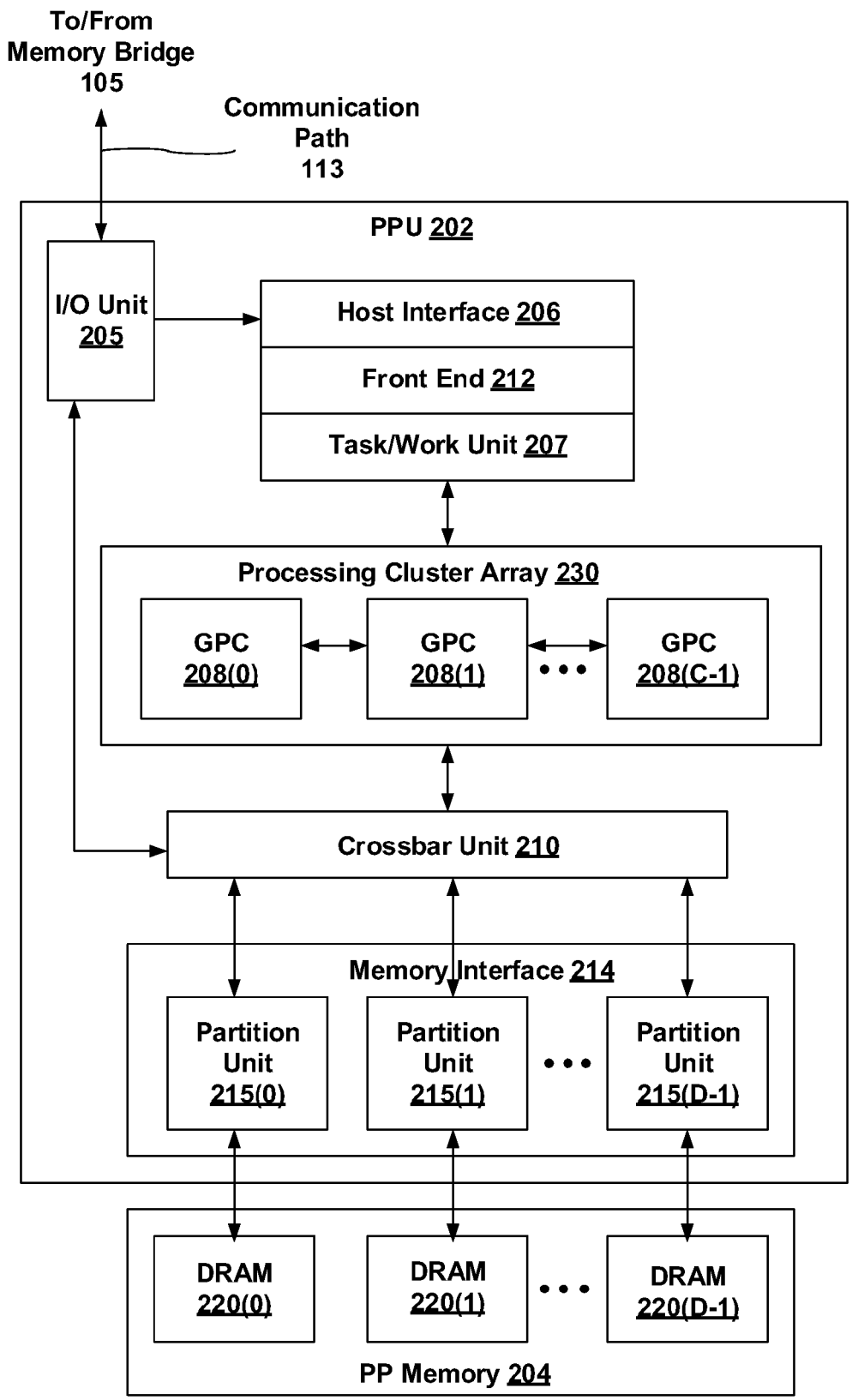
FIG. 2 is a block diagram of a parallel processing unit included in the parallel processing subsystem of FIG. 1, according to one embodiment of the present invention.

FIG. 2 is a block diagram of a parallel processing unit (PPU) 202 included in the parallel processing subsystem 112 of FIG. 1, according to one embodiment of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where $C \geq 1$. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where $D \geq 1$. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPCs 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Detection of Elementary Valued Operands in an Arithmetic Processing Element

Figure 3:
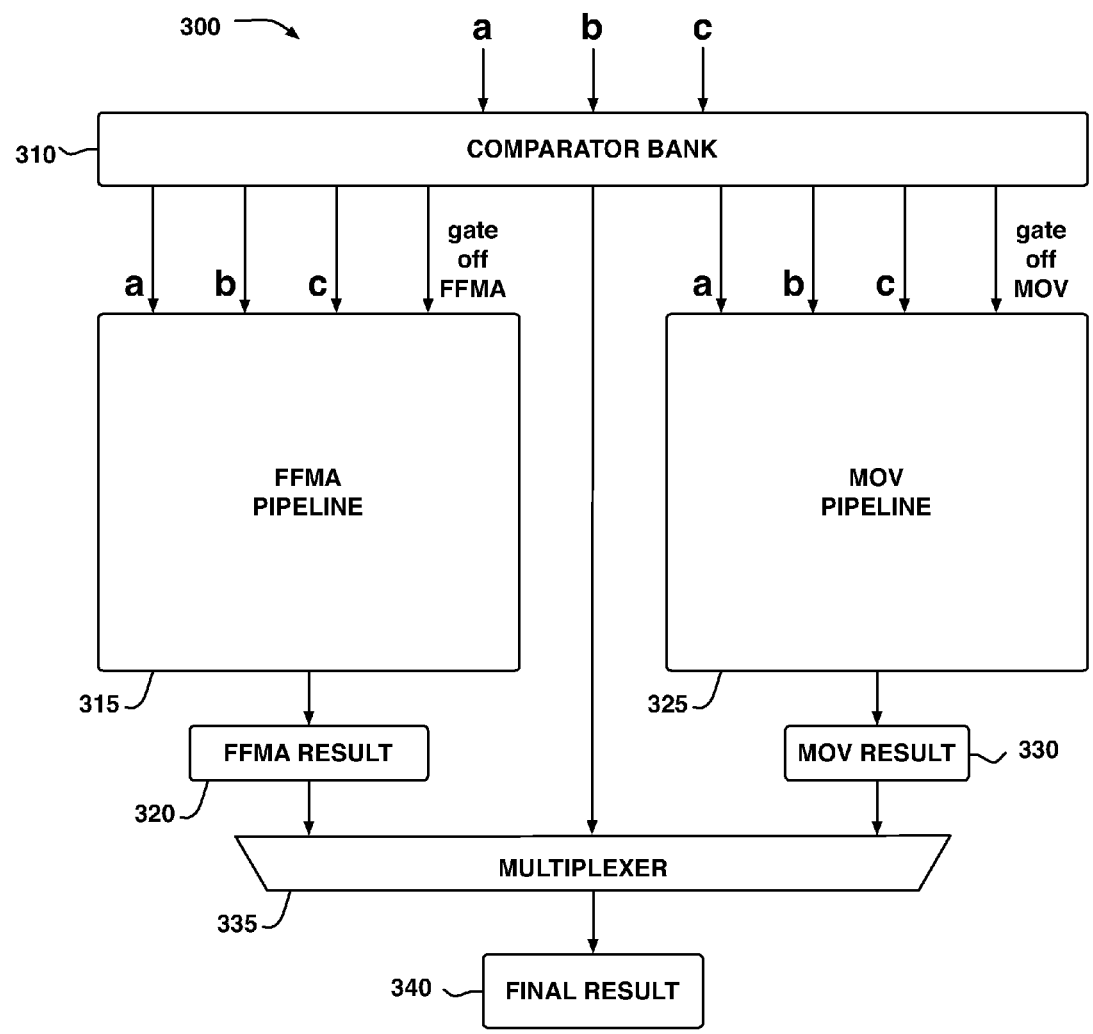
FIG. 3 is a conceptual diagram of an arithmetic processing element, according to one embodiment of the present invention.

FIG. 3 is a conceptual diagram of an arithmetic processing element 300, according to one embodiment of the present invention. Arithmetic processing element 300 may be included within any portion of computer system 100 of FIG. 1 that is configured to perform integer arithmetic operations. For example, CPU 102 of FIG. 1 or PPU 202 of FIG. 2 may include one or more instances of arithmetic processing element 300. As a general matter, arithmetic processing element 300 may be incorporated into any type of computer device, including server machines, desktop machines, laptop computers, mobile devices, handheld devices, and so forth. One embodiment of the present invention performs arithmetic operations in an improved manner by detecting elementary operands, such as zero or very near zero and 1.0 or very near 1.0, and greatly simplifying operations in a manner that is described in greater detail below.

As shown, arithmetic processing element 300 includes comparator bank 310, FFMA pipeline 315, FFMA result 320, MOV pipeline 325, and MOV result 330. Multiplexer 335 produces final result 340.

Comparator bank 310 receives three operands, a, b, and c, in floating point format, as inputs. Floating point numbers are typically 32 bits wide with the 24 right most, or least significant, bits representing the value of the number, called the mantissa. The 8 left most, or most significant, bits represent the value of the exponent.

When comparator bank 310 detects a zero value for operand a, comparator bank 310 gates off FFMA pipeline 315, as the product is a known zero value. Comparator bank 310 further enables MOV pipeline 325, which then forwards the c operand, regardless of its value, as MOV result 330, to multiplexer 335. Comparator bank 310 configures multiplexer 335 to produce a final result 340 equal to the value of operand c. A considerable savings in math processing power and processing cycle time is thus realized as MOV pipeline 325 is a much less power intensive element than the FFMA pipeline 315 and acts in a reduced cycle time relative to FFMA pipeline 315.

Similarly, when comparator bank 310 detects a zero value for operand b, comparator bank 310 gates off FFMA pipeline 315, as the product is a known zero value. Comparator bank 310 further enables MOV pipeline 325, which then forwards the c operand, regardless of its value, as MOV result 330, to multiplexer 335. Comparator bank 310 configures multiplexer 335 to produce a final result 340 equal to the value of operand c. Again, a considerable savings in dynamic math processing power and processing cycle time is realized.

When comparator bank 310 detects a 1.0 value for operand a, the product (a*b) is known to be the value of operand b. If comparator bank 310 further detects that operand c is zero, comparator bank 310 gates off FFMA pipeline 315 enables MOV pipeline 325, and directs operand b through multiplexer 335. Final result 340 is then equal to operand b, and considerable savings in overhead and dynamic math processing power and processing cycle time is realized.

Similarly, when comparator bank 310 detects a 1.0 value for operand b, the product (a*b) is known to be the value of operand a. If comparator bank 310 further detects that operand c is zero, comparator bank 310 gates off FFMA pipeline 315, enables MOV pipeline 325, and directs operand a through multiplexer 335. Final result 340 is then equal to operand a, and considerable savings are again realized.

If comparator bank 310 detects a 1.0 value for operand a and also for operand b, comparator bank 310 gates off FFMA pipeline 315, enables MOV pipeline 325 and directs the value 1.0 through multiplexer 335. Final result 340 is then equal to 1.0. Savings are again realized in this mode relative to a conventional FFMA operation.

When none of the three operands is zero or 1.0, comparator bank 310 enables FFMA pipeline 315, gates off MOV pipeline 325, and enables multiplexer 335 to forward FFMA result 320 to final result 340. In this mode, arithmetic processing element 300 performs a conventional FFMA operation, which generates the mathematical output (a*b+c).

Figure 4:
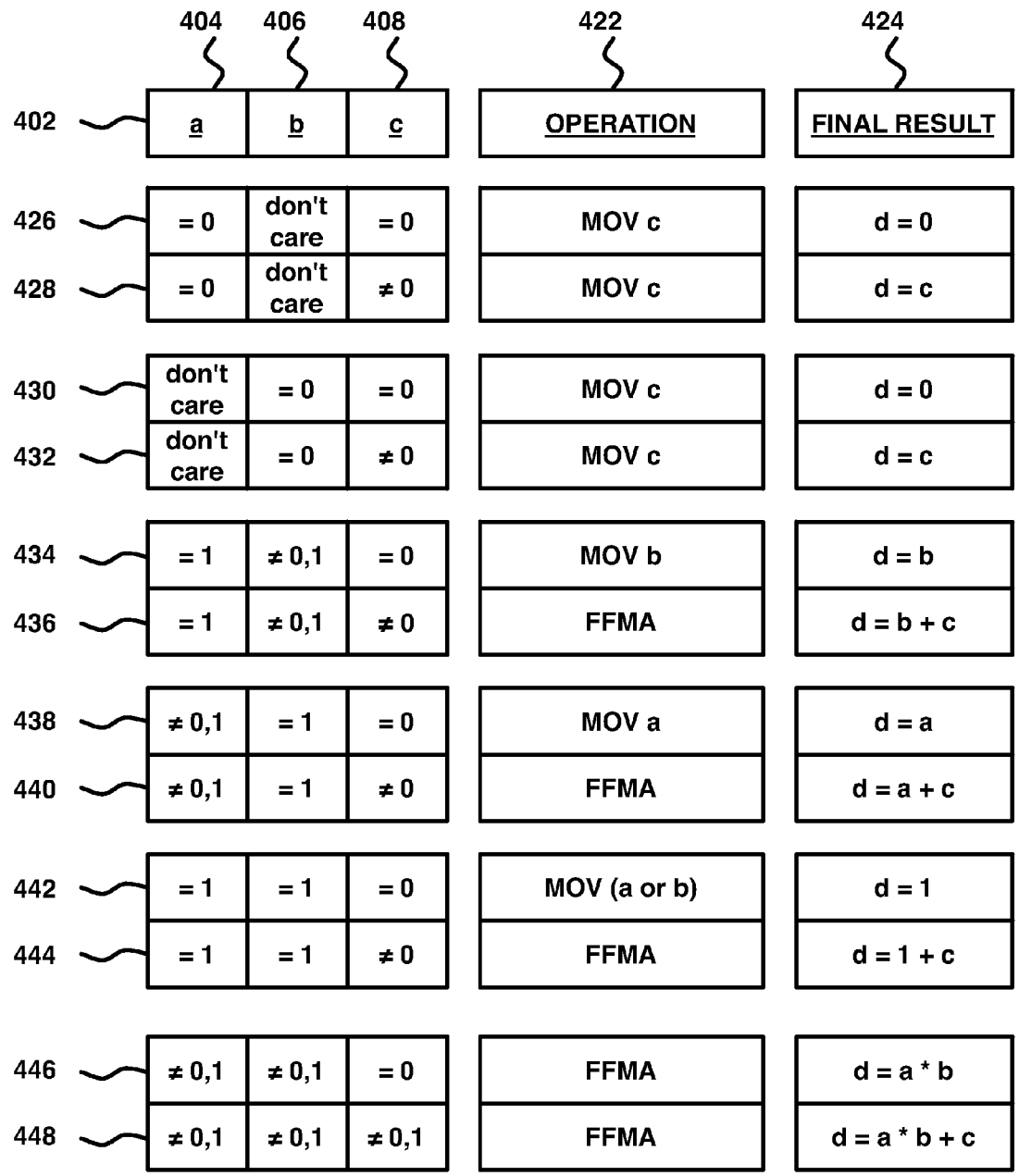
FIG. 4 illustrates a table of operations that may be performed upon detecting elementary valued operands, according to one embodiment of the present invention.

FIG. 4 illustrates a table of operations that may be performed upon detecting elementary valued operands, according to one embodiment of the present invention. As shown, row 402 shows the headings identifying the contents of each column. Columns 404, 406, and 408 show the various possible value combinations for operands a, b, and c respectively. Column 422 shows the operation that arithmetic processing element 300 performs given the conditions in columns 404, 406, and 408. Column 424 shows the final result of the operation performed in column 422.

Rows 426, 428, 430, and 432 show, in column 422, that a MOV operation is performed whenever either the a operand, the b operand, or both, are zero valued. Rows 426, 428, 430, and 432 further show, in column 424, that the result is equal to the c operand, the result being zero when the c operand is zero.

Rows 434 and 436 describe the performance of arithmetic processing element 300 when the a operand has a value of 1.0 and the b operand is non-trivial. Row 434 shows, in column 422, that a MOV operation is performed if the c operand has a value of zero, and further shows in column 424 that the final result is equal to the value of the b operand. Row 436 shows, in column 422, that an FFMA operation is performed if the c operand has non-zero value and further shows, in column 424, that the final result is equal to (b+c), Similarly, Rows 438 and 440 describe the performance of arithmetic processing element 300 when the b operand has a value of 1.0 and the a operand is non-trivial. Row 438 shows, in column 422, that a MOV operation is performed if the c operand has a value of zero, and further shows in column 424 that the final result is equal to the value of the a operand. Row 440 shows, in column 422, that an FFMA operation is performed if the c operand has non-zero value and further shows, in column 424, that the final result is equal to (a+c).

Rows 442 and 444 describe the performance of arithmetic processing element 300 when the a operand and the b operand both have a value of 1.0. Row 442 shows, in column 422, that a MOV operation is performed if the c operand has a value of zero, and further shows, in column 424, that the result is equal to 1.0 when the c operand has a value of zero. Row 444 shows, in column 422, that an FFMA operation is performed if the c operand has non-zero value, and further shows, in column 424, that the result is equal to (1+c) if the c operand has non-zero value.

Row 446 describes the operation performed by arithmetic processing element 300 when only the c operand has a zero value. Row 446 shows, in column 422, that an FFMA operation is performed when only the c operand has a value of zero. Row 446 further shows, in column 424, that the result is (a*b) when only the c operand has a value of zero.

Row 448 describes the operation performed by arithmetic processing element 300 when none of the operands have elementary values. Row 448 shows, in column 422, that an FFMA operation is performed when none of the operands has elementary values. Row 448 further shows, in column 424, that the result is (a*b+c) when none of the operands have elementary values.

Figure 5:
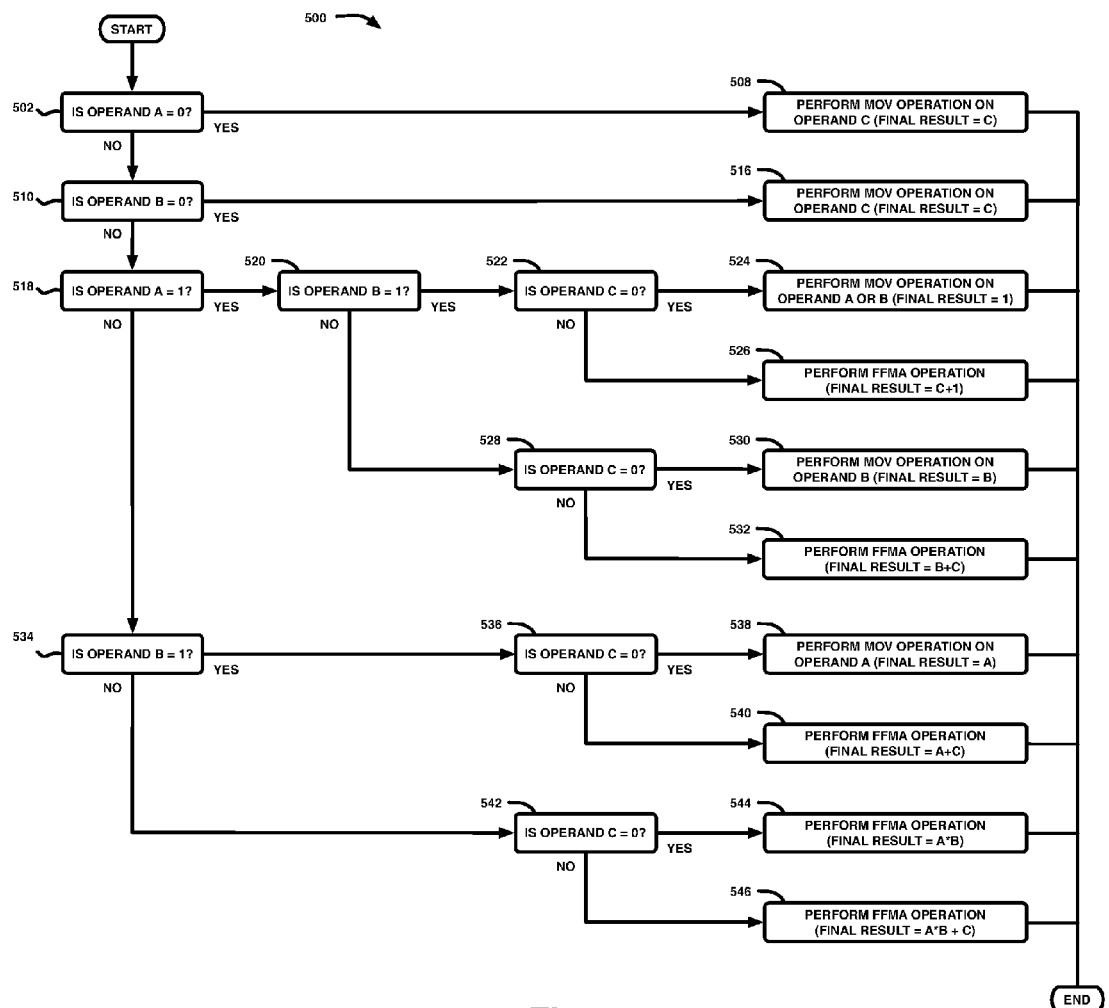
FIG. 5 is a flow diagram of method steps for performing simplified arithmetic operations upon detecting elementary valued operands, according to one embodiment of the present invention.

FIG. 5 is a flow diagram of method steps for performing simplified arithmetic operations upon detecting elementary valued operands, according to one embodiment of the present invention. Although the method steps are described in conjunction with the systems of FIGS. 1-4, persons skilled in the art will understand that any system configured to perform the method steps, in any order, is within the scope of the present invention.

As shown, a method 500 begins at step 502, where comparator bank 310 determines if operand a has zero, or near zero, value. If operand a has zero, or near zero, value, comparator bank 310 gates off FFMA pipeline 315, enables MOV pipeline 325, and forwards, in step 508, operand c to MOV result 330. Comparator bank 325 further configures multiplexer 335 in step 508 to generate a final result 340 equal to the c operand.

If operand a is not zero or near zero in step 502, comparator bank 310 determines if operand b has zero, or near zero, value in step 510. If operand b has zero, or near zero, value, comparator bank 310 gates off FFMA pipeline 315, enables MOV pipeline 325, and forwards, in step 508, operand c to MOV result 330. Comparator bank 325 further configures multiplexer 335 in step 510 to generate a final result 340 equal to the c operand.

If operand b is not zero or near zero in step 510, comparator bank 310 determines if operand a has 1.0, or near 1.0, value in step 518. If operand a has 1.0, or near 1.0, value, comparator bank 310 determines if operand b has 1.0, or near 1.0, value in step 520. If operand b has 1.0, or near 1.0, value, comparator bank 310 determines if operand c has zero, or near zero, value in step 522. If operand c has zero, or near zero, value, comparator bank 310 gates off FFMA element 315, enables MOV element 325, and performs a MOV operation in step 524 and directs operand a or operand b (both have value 1.0) to the output of multiplexer 335 to generate a final result 340 equal to 1.0. If operand c has non-zero value, comparator bank 310 gates off multiplier array 310 and directs operand a or operand b (both have value 1.0) to the output of multiplexer 345 in step 526. Comparator bank 310 further directs the output of adder 335 to the output of multiplexer 350 to generate a final result 365 of (c+1) in step 526.

If operand b is not 1.0, or near 1.0 in step 520, comparator bank 310 determines if operand c has zero, or near zero, value in step 528. If operand c has zero, or near zero, value, comparator bank 310 gates off FFMA pipeline 315, enables MOV pipeline 325, performs a MOV operation in step 530 and directs operand b to the output of multiplexer 335 to generate a final result 340 equal to operand b. If operand c has non-zero value, comparator bank 310 gates off MOV pipeline 325, enables FFMA pipeline 315, and performs an FFMA operation in step 532. Comparator bank 310 further directs FFMA result 320 to the output of multiplexer 335 to generate a final result 365 of (b+c) in step 532.

If operand a is not 1.0, or near 1.0, in step 518, comparator bank 310 determines if operand b has 1.0, or near 1.0, value in step 534. If operand b has 1.0, or near 1.0, value, comparator bank 310 determines if operand c has zero, or near zero, value in step 536. If operand c has zero, or near zero, value, comparator bank 310 gates off FFMA pipeline 315, enables MOV pipeline 325, performs a MOV operation in step 538 and directs operand a to the output of multiplexer 335 to generate a final result 340 equal to operand a. If operand c has non-zero value, comparator bank 310 gates off MOV pipeline 325, enables FFMA pipeline 315, and performs an FFMA operation in step 540. Comparator bank 310 further directs FFMA result 320 to the output of multiplexer 335 to generate a final result 340 of (a+c) in step 540.

If operand b is not 1.0, or near 1.0, in step 534, a comparator within detection logic 340 determines if operand c has zero, or near zero, value in step 542. If operand c has zero, or near zero, value, detection logic 340 gates off shifter 325, exponent path 320, multiplexer 345, and adder 335 and directs product 315 to the output of multiplexer 350 to generate a final result 365 of (a*b) in step 544. If operand c has non-zero value in step 542, comparator bank 310 gates off MOV pipeline 325, enables FFMA pipeline 315, and performs an FFMA operation in step 544. Comparator bank 310 further directs FFMA result 320 to the output of multiplexer 335 to generate a final result 340 of (a*b+c) in step 546.

In some instances an operand may be NaN, which stands for "not a number" and can result from divide-by-zero operations or other infinities. Depending on the required standards compliance or desired processing mode, occurrence of a NaN can be optimized in a variety of ways. Persons skilled in the art will understand that any method to optimize performing arithmetic operations on a NaN with elementary operands is within the scope of the present invention.

Detection of Zero Valued Operands in a Math Processing Subsystem

As described above, improved performance can be realized by detecting when elementary operands are applied to the arithmetic processing element 300 and simplifying the math operations accordingly. Further improvement can be realized by detecting when the math computation, performed in a math processing subsystem, results in a value of zero.

Figure 6:
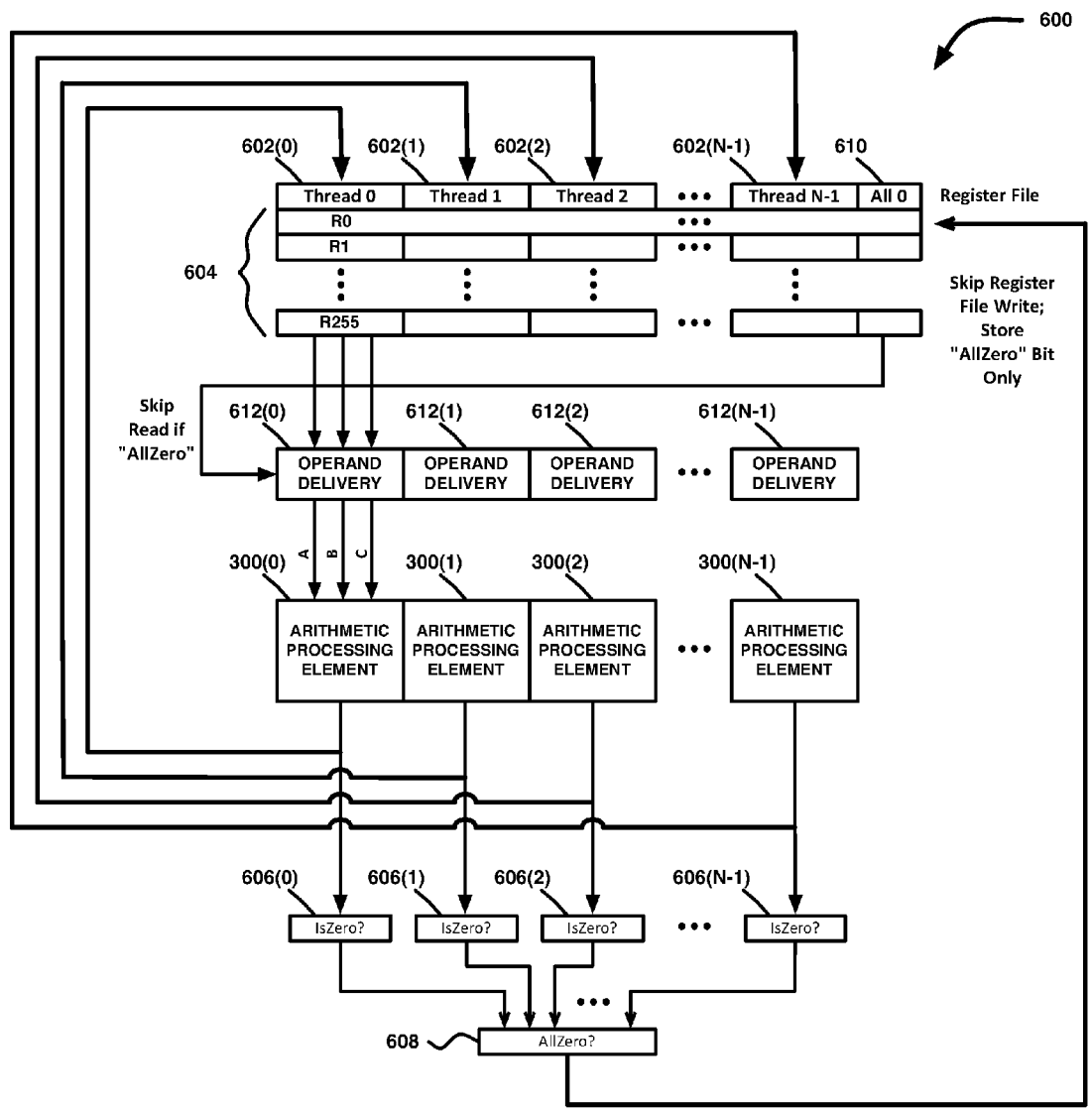
FIG. 6 is a conceptual diagram of a math processing subsystem, that includes multiple instances of the arithmetic processing element of FIG. 3, according to one embodiment of the present invention.

FIG. 6 is a conceptual diagram of a math processing subsystem 600, according to one embodiment of the present invention. As shown, math processing subsystem 600 includes register files 604, operand delivery elements 612, one or more arithmetic processing elements 300, and threads 602. Arithmetic processing elements 300 connect to comparators 606 which connect, in turn, to AllZero comparator 608. Arithmetic processing elements 300 perform math operations and write the results back into the register files 604.

Threads 602 are associated with register files 604, operand delivery elements 612, and arithmetic processing elements 300. A collection of threads is referred to herein as a "warp". Each thread 602 is associated with one or more register files 604. In one embodiment, some or all of thread registers may be read from or written to at the same time, and may thus be stored as a single wide RAM entry.

Operand delivery element 612 is comprised of logic that routes and buffers register values from the register files to provide the operands to arithmetic processing element 300. Comparator 606 examines the output of arithmetic processing element 300 from each thread 602 to determine if the result of the math computation yields a value of zero, or near zero. In the event that the result of the math computation for all threads yield values of zero, it is known that the arithmetic operations are trivial, and comparator 608 writes a zero to the "all 0" bit 610 that is appended to each warp-wide register file 604. This obviates the need to perform further arithmetic operations because AllZero bit 610 prevents writing operands to warp-register file 604. Similarly, AllZero bit 610 prevents reading operands from warp-register 604. Avoiding such write and read operations conserves power. Further, the arithmetic processing elements 300 may also be gated to a low power state.

Figure 7:
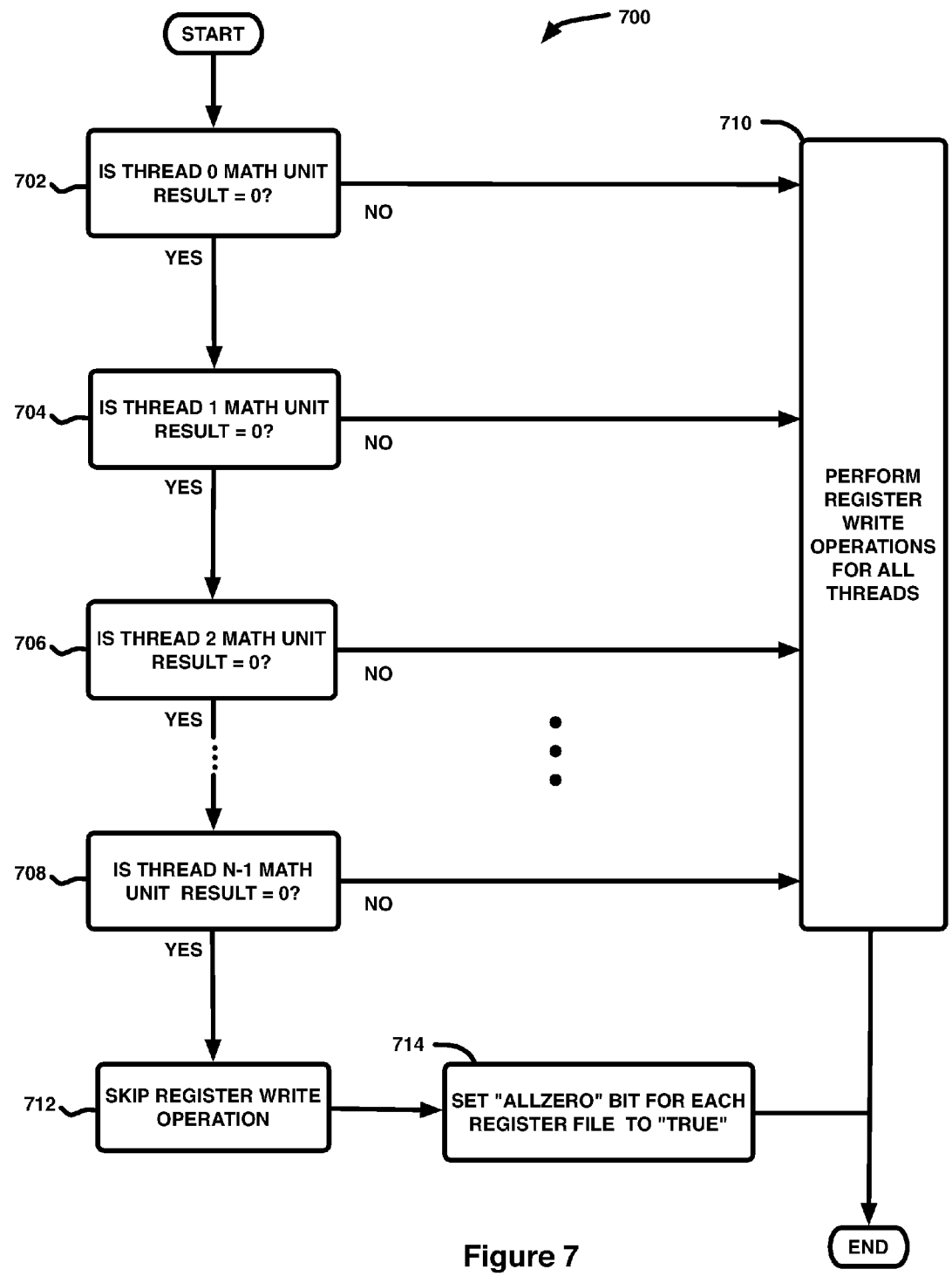
FIG. 7 is a flow diagram of method steps for performing simplified register write operations upon detecting zero valued operands, according to one embodiment of the present invention.

FIG. 7 is a flow diagram of method steps for performing simplified register write operations upon detecting zero valued operands, according to one embodiment of the present invention. Although the method steps are described in conjunction with the systems of FIGS. 1-4 and 6, persons skilled in the art will understand that any system configured to perform the method steps, in any order, is within the scope of the present invention.

As shown, a method 700 begins at step 702, where a comparator 606(0) determines if the result of the operation performed by arithmetic processing element 300(0) of thread 0 602(0) is equal to zero. If the result of the operation performed by arithmetic processing element 300(0) of thread 0 602(0) is not equal to zero, then, in step 710, each arithmetic processing element 300 for each thread 602 performs a write operation of its results back into the respective register file 604.

If the result of the operation performed by arithmetic processing element 300(0) of thread 0 602(0) is equal to zero, a comparator 606(1) determines in step 704 if the result of the operation performed by arithmetic processing element 300(1) of thread 1 602(1) is equal to zero. If the result of the operation performed by arithmetic processing element 300(1) of thread 1 602(1) is not equal to zero, then, in step 710, each element 300 for each thread 602 performs a write operation of its results back into the respective register file 604.

If the result of the operation performed by arithmetic processing element 300(1) of thread 1 602(1) is equal to zero, a comparator 606(2) determines in step 706 if the result of the operation performed by arithmetic processing element 300(2) of thread 2 602(2) is equal to zero. If the result of the operation performed by arithmetic processing element 300(2) of thread 2 602(2) Is not equal to zero, then, in step 710, each math unit 300 for each thread 602 performs a write operation of its results back into the respective register file 604.

The method proceeds in this manner to the final thread 602(N−1). If the results of the operation performed by all prior arithmetic processing elements 300 have been equal to zero, a comparator 606(N−1) determines in step 708 if the result of the operation performed by arithmetic processing element 300(N−1) of thread N−1 602 (N−1) is equal to zero.

If the result of the operation performed by arithmetic processing element 300(N–1) of thread N–1 602(N–1) is not equal to zero, then, in step 710, each arithmetic processing element 300 for each thread 602 performs a write operation of its results back into the respective file 604.

If the result of the operation performed by the arithmetic processing element 300(N–1) of thread N–1 602(N–1) is equal to zero, then all-zero comparator 608 inhibits all register file 604 write operations in step 712. In step 714, the all-zero comparator 608 sets to true the "all zero" bit 610 for each register file 604.

In sum, computer and graphics processing systems typically perform a great number of multiply-add operations. In a significant portion of these operations, the values of one or more of the operands are zero or 1.0. When a zero or 1.0 valued operand occurs as input to a multiply unit, the result is known to be zero or the second operand, respectively. A less power intensive move operation can be performed, and the processing power and cycle time required for the multiply operation is thus saved. Similarly when a zero valued operand is input to an add unit, the result is known to be the second operand. Again, a less power intensive move operation can be performed, and the processing power and cycle time required for the add operation is thus saved. Thus, a system can realize improved math processing by detection of elementary valued operands.

One advantage of the techniques disclosed herein is that the simplified math operations resulting from detecting elementary valued operands can provide significant savings in overhead power, dynamic processing power, and cycle time.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

The invention claimed is:

1. A computer-implemented method for performing multiply-add operations, the method comprising:
   receiving a plurality of input operands;
   detecting that at least one input operand has an elementary value;
   gating off one or more portions of a math processing circuit based on the at least one operand having the elementary value;
   after gating off one or more portions of the math processing circuit, performing one or more abbreviated math operations via the math processing circuit to generate a result; and
   if the result does not have a zero value or an effective value of zero, then forwarding the result to a final output register; or
   if the result has a zero value or an effective value of zero, then enabling an all-zero bit associated with the final output register to be set.

2. The computer-implemented method of claim 1, wherein:
   detecting comprises detecting that a first input operand has a zero value or an effective value of zero;
   gating off comprises gating off a multiply portion of the math processing circuit;
   performing one or more abbreviated math operations comprises ignoring a second input operand; and
   forwarding the result comprises forwarding a third input operand to the final output register.

3. The computer-implemented method of claim 1, wherein:
   detecting comprises detecting that a second input operand has a zero value or an effective value of zero;
   gating off comprises gating off a multiply portion of the math processing circuit;
   performing one or more abbreviated math operations comprises ignoring a first input operand; and
   forwarding the result comprises forwarding a third input operand to the final output register.

4. The computer-implemented method of claim 1, wherein:
   detecting comprises detecting that a third input operand has a zero value or an effective value of zero;
   gating off comprises gating off an adder portion of the math processing circuit; and
   performing one or more abbreviated math operations comprises performing a multiply operation on a first input operand and a second input operand to generate the result.

5. The computer-implemented method of claim 1, wherein:
   detecting comprises detecting that a first input operand has a value of one or an effective value of one;
   gating off comprises gating off a multiply portion of the math processing circuit; and
   performing one or more abbreviated math operations comprises performing an add operation on a second input operand and a third input operand to generate the result.

6. The computer-implemented method of claim 1, wherein:
   detecting comprises detecting that a second input operand has a value of one or an effective value of one;
   gating off comprises gating off a multiply portion of the math processing circuit; and
   performing one or more abbreviated math operations comprises performing an add operation on a first input operand and a third input operand to generate the result.

7. The computer-implemented method of claim 1, wherein:
   detecting comprises detecting that a first input operand has a value of one or an effective value of one;
   detecting comprises detecting that a third input operand has a value of zero or an effective value of zero;
   gating off comprises:
      gating off a multiply portion of the math processing circuit, and
      gating off an adder portion of the math processing circuit; and
   performing one or more abbreviated math operations comprises performing a move operation on a second input operand to generate the result.

8. A processing subsystem configured to perform multiply-add operations, the subsystem comprising:
an operand delivery element configured to receive a plurality of input operands;
detection logic configured to:
   detect that at least one input operand has an elementary value, and
   gate off one or more portions of math processing circuitry based on the at least one operand having the elementary value; and
the math processing circuitry configured to:
   perform one or more abbreviated math operations to generate a first result after the one or more portions have been gated off; and
   if the first result does not have a zero value or an effective value of zero, then forwarding the result to a final output register; or
   if the first result has a zero value or an effective value of zero, then enabling an all-zero bit associated with the final output register to be set.

9. The subsystem of claim 8, wherein:
the detection logic is configured to:
   detect that a first input operand has a zero value or an effective value of zero, and
   gate off a multiply portion of the math processing circuitry; and
the math processing circuitry is configured to perform the one or more abbreviated math operations by ignoring a second input operand; and
further comprising a multiplexer configured to forward a third input operand to a final output register as a second result.

10. The subsystem of claim 8, wherein:
the detection logic is configured to:
   detect that a second input operand has a zero value or an effective value of zero, and
   gate off a multiply portion of the math processing circuitry;
the math processing circuitry is configured to perform the one or more abbreviated math operations by ignoring a first input operand; and
further comprising a multiplexer configured to forward a third input operand to a final output register as a second result.

11. The subsystem of claim 8, wherein:
the detection logic is configured to:
   detect that a third input operand has a zero value or an effective value of zero, and
   gate off an adder portion of the math processing circuitry; and
the math processing circuitry is configured to perform the one or more abbreviated math operations by performing a multiply operation on a first input operand and a second input operand to generate the result.

12. The subsystem of claim 8, wherein:
the detection logic is configured to:
   detect that a first input operand has a value of one or an effective value of one, and
   gate off a multiply portion of the math processing circuitry; and
the math processing circuitry is configured to perform the one or more abbreviated math operations by performing an add operation on a second input operand and a third input operand to generate the result.

13. The subsystem of claim 8, wherein:
the detection logic is configured to:
   detect that a second input operand has a value of one or an effective value of one, and
   gate off a multiply portion of the math processing circuitry; and
the math processing circuitry is configured to perform the one or more abbreviated math operations by performing an add operation on a first input operand and a third input operand to generate the result.

14. The subsystem of claim 8, wherein:
the detection logic is configured to:
   detect that a first input operand has a value of one or an effective value of one,
   detect that a third input operand has a value of zero or an effective value of zero,
   gate off a multiply portion of the math processing circuitry, and
   gate off an adder portion of the math processing circuitry; and
the math processing circuitry is configured to perform the one or more abbreviated math operations by performing a move operation on a second input operand to generate the result.

15. A computing device, comprising:
a memory; and
a processor coupled to the memory and including:
   a subsystem configured to perform math operations and having:
      a register file that includes an array of register memories, wherein each column of register memories is associated with a different thread of a thread group,
      a plurality of arithmetic units, wherein each arithmetic unit is associated with a different thread of the thread group,
      a plurality of comparators, wherein each comparator is associated with a different arithmetic unit included in the plurality of arithmetic units, and
      an all-zero comparator,
      wherein, in response to each comparator detecting that a result of one or more math operations executed by a respective thread within the arithmetic unit associated with the comparator is equal to zero, the all-zero comparator is configured to set an all-zero bit in the register file for each thread of the thread group.

16. The computing device of claim 15, wherein the processor comprises a central processing unit or a graphics processing unit.

17. The computing device of claim 15, wherein the one or more math operations comprise one or more multiply-add operations.

18. The computing device of claim 16, wherein each arithmetic unit includes:
an operand delivery element configured to receive a plurality of input operands,
detection logic configured to:
   detect that at least one input operand has an elementary value, and
   gate off one or more portions of math processing circuitry based on the at least one operand having the elementary value, and
math processing circuitry configured to perform one or more abbreviated math operations to generate a result after the one or more portions have been gated off.

19. The computing device of claim 18, wherein:
the detection logic is configured to:
   detect that a first input operand has a zero value or an effective value of zero, and gate off a multiply portion of the math processing circuitry; and the math processing circuitry is configured to perform the one or more abbreviated math operations by ignoring a second input operand; and further comprising a multiplexer configured to forward a third input operand to a final output register as the result.

20. The computing device of claim 18, wherein:

the detection logic is configured to:

detect that a first input operand has a value of one or an effective value of one, and gate off a multiply portion of the math processing circuitry; and the math processing circuitry is configured to perform the one or more abbreviated math operations by performing an add operation on a second input operand and a third input operand to generate the result.

\* \* \* \* \*